(12) United States Patent
Bryant et al.

(10) Patent No.: US 10,083,126 B2
(45) Date of Patent: Sep. 25, 2018

(54) APPARATUS AND METHOD FOR AVOIDING CONFLICTING ENTRIES IN A STORAGE STRUCTURE

(71) Applicant: ARM Limited, Cambridge (GB)

(72) Inventors: Richard F Bryant, Chandler, AZ (US); Max John Batley, Cottenham (GB); Lilian Atieno Hutchins, Chandler, AZ (US); Sujat Jamil, Gilbert, AZ (US)

(73) Assignee: ARM Limited, Cambridge (GB)

( * ) Notice: Subject to any disclaimer, the term of this patent is extended or adjusted under 35 U.S.C. 154(b) by 106 days.

(21) Appl. No.: 15/370,570

(22) Filed: Dec. 6, 2016

(65) Prior Publication Data

US 2018/0157601 A1    Jun. 7, 2018

(51) Int. Cl.
| | | |
|---|---|---|
| *G06F 12/12* | (2016.01) | |
| *G06F 12/10* | (2016.01) | |
| *G06F 12/1036* | (2016.01) | |

(52) U.S. Cl.
CPC .......... *G06F 12/12* (2013.01); *G06F 12/1036* (2013.01)

(58) Field of Classification Search
None
See application file for complete search history.

(56) References Cited

U.S. PATENT DOCUMENTS

| | | | | |
|---|---|---|---|---|
| 2002/0007439 A1* | 1/2002 | Gharachorloo | ..... | G06F 12/0826 711/119 |
| 2005/0050278 A1* | 3/2005 | Meier | ................. | G06F 12/0864 711/128 |
| 2011/0072235 A1* | 3/2011 | Deming | .............. | G06F 12/1027 711/207 |

(Continued)

*Primary Examiner* — Mano Padmanabhan
*Assistant Examiner* — William E Baughman
(74) *Attorney, Agent, or Firm* — Nixon & Vanderhye P.C.

(57) ABSTRACT

An apparatus and method are provided for avoiding conflicting entries in a storage structure. The apparatus comprises a storage structure having a plurality of entries for storing data, and allocation circuitry, responsive to a trigger event for allocating new data into the storage structure, to determine a victim entry into which the new data is to be stored, and to allocate the new data into the victim entry upon determining that the new data is available. Conflict detection circuitry is used to detect when the new data will conflict with data stored in one or more entries of the storage structure, and to cause the data in said one or more entries to be invalidated. The conflict detection circuitry is arranged to perform, prior to a portion of the new data required for conflict detection being available, at least one initial stage detection operation to determine, based on an available portion of the new data, candidate entries whose data may conflict with the new data. A record of the candidate entries in then maintained, and, once the portion of the new data required for conflict detection is available, the conflict detection circuitry then performs a final stage detection operation to determine whether any of the candidate entries do contain data that conflicts with the new data. Any entries identified by the final stage detection operation as containing data that conflicts with the new data are then invalidated. This provides a particularly efficient mechanism for avoiding conflicting entries in a storage structure.

18 Claims, 12 Drawing Sheets

(56) References Cited

U.S. PATENT DOCUMENTS

| | | | |
|---|---|---|---|
| 2011/0231593 A1* | 9/2011 | Yasufuku | G06F 12/1027 711/3 |
| 2014/0095784 A1* | 4/2014 | Tran | G06F 12/1027 711/108 |
| 2014/0201494 A1* | 7/2014 | Venkumahanti | G06F 12/1027 711/207 |
| 2017/0091097 A1* | 3/2017 | Waugh | G06F 12/0815 |
| 2017/0097898 A1* | 4/2017 | Durham | G06F 12/1027 |

* cited by examiner

APPARATUS AND METHOD FOR AVOIDING CONFLICTING ENTRIES IN A STORAGE STRUCTURE

BACKGROUND

The present technique relates to an apparatus and method for avoiding conflicting entries in a storage structure.

In modern data processing systems, a variety of different storage structures are used. For some storage structures, it is important to ensure that when data is allocated into an entry of the storage structure, that data does not conflict with data stored in another entry of the storage structure. In particular, the presence of such conflicting entries could cause incorrect operation of the data processing system, and/or data corruption. An example of a storage structure that requires conflict detection mechanisms to be provided to ensure that conflicting entries do not arise is a translation lookaside buffer (TLB) that provides address translation data used to convert a virtual address into a corresponding physical address within a page of physical memory. In particular, when a new virtual address is specified, and a lookup operation is accordingly performed within such a TLB, there should at most be only one entry that provides the required address translation data.

In some storage structures where associated conflict detection circuitry is required, it may not be possible to determine whether a conflict situation exists or not in relation to new data being allocated into an entry of the storage structure until that data is fully available for allocation. For instance, considering the earlier example of a TLB, the page size information associated with new address translation data to be allocated into an entry of the TLB may be needed before it can be determined whether any of the other entries contain address translation data that would conflict with the new address translation data.

However, performing conflict detection at such a late stage can cause significant performance problems. It would hence be desirable to provide an improved mechanism for avoiding conflicting entries in a storage structure.

SUMMARY

In one example configuration, there is provided an apparatus comprising: a storage structure comprising a plurality of entries, each entry for storing data allocated into that entry; allocation circuitry, responsive to a trigger event for allocating new data into the storage structure, to determine a victim entry into which the new data is to be stored, and to allocate the new data into the victim entry upon determining that the new data is available; conflict detection circuitry to detect when the new data will conflict with data stored in one or more entries of the storage structure, and to cause the data in said one or more entries to be invalidated; the conflict detection circuitry being arranged: to perform, prior to a portion of the new data required for conflict detection being available, at least one initial stage detection operation to determine, based on an available portion of the new data, candidate entries whose data may conflict with the new data; to maintain a record of the candidate entries; to perform, once said portion of the new data required for conflict detection is available, a final stage detection operation to determine whether any of the candidate entries do contain data that conflicts with the new data; and to cause invalidation of the data in any entries identified by the final stage detection operation as containing data that conflicts with the new data.

In another example configuration, there is provided a method of avoiding conflicting entries in a storage structure comprising a plurality of entries, each entry for storing data allocated into that entry, the method comprising: determining, responsive to a trigger event for allocating new data into the storage structure, a victim entry into which the new data is to be stored, and allocating the new data into the victim entry upon determining that the new data is available; detecting when the new data will conflict with data stored in one or more entries of the storage structure, and causing the data in said one or more entries to be invalidated; the detecting step comprising: performing, prior to a portion of the new data required for conflict detection being available, at least one initial stage detection operation to determine, based on an available portion of the new data, candidate entries whose data may conflict with the new data; maintaining a record of the candidate entries; performing, once said portion of the new data required for conflict detection is available, a final stage detection operation to determine whether any of the candidate entries do contain data that conflicts with the new data; and causing invalidation of the data in any entries identified by the final stage detection operation as containing data that conflicts with the new data.

In a yet further example configuration, there is provided an apparatus comprising: a storage means comprising a plurality of entry means, each entry means for storing data allocated into that entry means; allocation means for determining, in response to a trigger event for allocating new data into the storage means, a victim entry means into which the new data is to be stored, and for allocating the new data into the victim entry means upon determining that the new data is available; conflict detection means for detecting when the new data will conflict with data stored in one or more entry means of the storage means, and for causing the data in said one or more entry means to be invalidated; the conflict detection means: for performing, prior to a portion of the new data required for conflict detection being available, at least one initial stage detection operation to determine, based on an available portion of the new data; candidate entry means whose data may conflict with the new data; for maintaining a record of the candidate entry means; for performing, once said portion of the new data required for conflict detection is available, a final stage detection operation to determine whether any of the candidate entry means do contain data that conflicts with the new data; and for causing invalidation of the data in any entry means identified by the final stage detection operation as containing data that conflicts with the new data.

BRIEF DESCRIPTION OF THE DRAWINGS

The present technique will be described further, by way of example only, with reference to embodiments thereof as illustrated in the accompanying drawings, in which.

DESCRIPTION OF EMBODIMENTS

Figure 1:
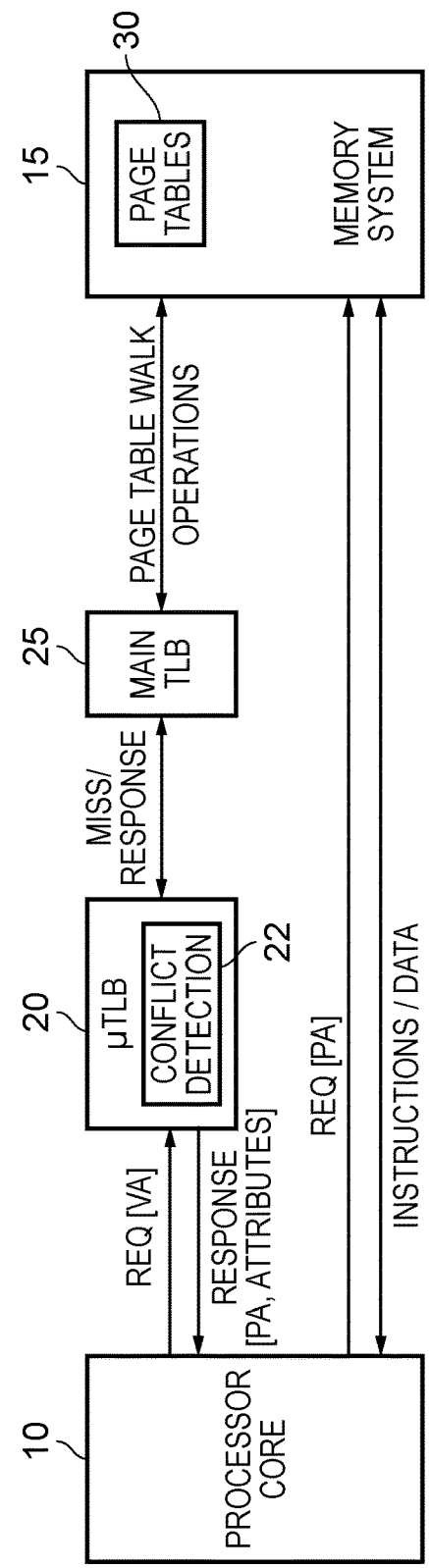
FIG. 1 illustrates a data processing system in accordance with one embodiment.

Before discussing the embodiments with reference to the accompanying figures, the following description of embodiments is provided.

As mentioned earlier, the information required to perform conflict detection in respect of data being allocated into a storage structure may only become available just prior to the data being allocated into the storage structure. Deferring performance of the conflict detection operation until the new data is available for allocation can give rise to a significant performance impact, due to the potentially significant quantity of comparisons that need to be performed in order to detect conflict situations. Further, the circuitry required to perform such conflict detection may be relatively large, which can adversely affect power consumption and area costs.

One approach that seeks to alleviate the above issues involves invalidating all potentially matching entries, rather than performing a full conflict detection operation. Whilst this does not cause any problems from the standpoint of correct operation when used in connection with storage structures such as TLBs, since if necessary the invalidated data can be retrieved again later, it causes more entries to be invalidated than are actually required in order to resolve the conflict issue, and hence can give rise to a significant performance impact in situations where the invalidated entries do contain information that is still relevant to processing operations being performed, and accordingly needs subsequently to be retrieved again.

The embodiments described herein aim to provide an improved mechanism for detecting conflicting entries in a storage structure. In one embodiment, an apparatus is provided that has a storage structure comprising a plurality of entries, where each entry is arranged to store data allocated into that entry by allocation circuitry. The allocation circuitry is responsive to a trigger event to determine a victim entry into which new data is to be stored, and is then arranged to allocate the new data into that victim entry upon determining that the new data is available. Conflict detection circuitry is then used to detect when the new data will conflict with data stored in one or more entries of the storage structure, and to cause the data in any such entries to be invalidated. This ensures that when the new data is allocated to the victim entry, there will be no other entries that store data that conflicts with that new data.

In accordance with one embodiment, the conflict detection circuitry is arranged to perform the conflict detection process in at least two separate stages. In particular, the conflict detection circuitry is arranged, at a point in time prior to a portion of the new data required for conflict detection being available, to perform at least one initial stage detection operation to determine, based on an available portion of the new data, any candidate entries whose data may conflict with the new data. A record of such candidate entries is then maintained by the conflict detection circuitry. It has been found that a significant number of the checks required for performing conflict detection can be performed at this stage, hence providing significant performance benefits when compared with an approach that only performs the conflict detection after the entirety of the new data is available for allocation into the victim entry.

In the above described embodiment, the conflict detection circuitry is then arranged, once the portion of the new data required for conflict detection is available, to perform a final stage detection operation to determine whether any of the candidate entries identified by the earlier initial stage detection operation(s) do in fact contain data that conflicts with the new data. Thereafter, the conflict detection circuitry causes invalidation of the data in any entries identified by the final stage detection operation as containing data that conflicts with the new data.

It has been found that in many instances the amount of processing required to be performed to implement the final stage detection operation is relatively small, when compared with the amount of processing that can be performed by the at least one initial stage detection operation, hence significantly improving performance since only the final stage detection operation needs to be deferred until the relevant portion of the new data required for conflict detection is available. Furthermore, only the entries that do in fact cause conflicts are invalidated, hence providing significant benefits relative to an approach which merely speculatively invalidates all entries that could potentially cause a conflict.

In one embodiment the apparatus further comprises lookup circuitry, responsive to a data request, to perform a lookup operation within the storage structure to determine whether the data required by the data request is stored within one of the entries of the storage structure. The conflict detection circuitry then employs a portion of the lookup circuitry to perform said at least one initial stage detection operation to determine candidate entries whose data may conflict with the new data.

Hence, in such an embodiment, the conflict detection circuitry can make use of pre-existing components within the lookup circuitry to perform the at least one initial stage detection operation, hence giving rise to significant area and power consumption improvements.

There are a number of ways in which the conflict detection circuitry could be arranged to employ the above-mentioned portion of the lookup circuitry. It could for instance perform the initial stage detection operation(s) at a separate time to any lookup operation, but reusing the lookup circuitry. However, in one embodiment, further efficiency improvements are realised by performing the at least one initial stage detection operation during the lookup operation performed by the lookup circuitry. In particular, the conflict detection circuitry may be arranged to employ said portion of the lookup circuitry to perform said at least one initial stage detection operation whilst the lookup operation is being performed, such that an indication of the candidate entries whose data may conflict with the new data is produced during the lookup operation.

By performing the initial stage detection operation(s) whilst the lookup operation is being performed, this means that an indication of the candidate entries that may conflict with the new data is available by the time the lookup operation is completed. If a hit is detected as a result of the lookup operation, i.e. indicating that one of the entries contains the data requested, then the indication of the candidate entries is not required, as no victim entry needs to be selected, and no new data needs to be allocated into the storage structure. However, in the event of a miss condition being detected by the lookup circuitry, the indication of the candidate entries whose data may conflict with the new data is available straight away, and in one embodiment the conflict detection circuitry is arranged to maintain a record of those candidate entries for later reference.

In one embodiment, the miss condition forms the trigger event used to allocate new data into the storage structure and hence causing the allocation circuitry to select the victim entry. Once the victim entry has been selected, any pre-existing content within that victim entry is no longer used. In one embodiment, advantage is taken of this fact, and in particular, rather than keeping a separate storage to maintain a record of the candidate entries, the conflict detection circuitry is arranged to maintain the record of the candidate entries within the victim entry. Hence, by such an approach, use can be made of storage capacity within the storage structure that is not currently being used, in order to maintain the record of candidate entries, hence avoiding the need to provide any separate dedicated storage to maintain the record of candidate entries. This provides further area savings.

In one embodiment, the record of candidate entries maintained within a portion of the victim entry can be retained therein until the point at which the new data is to be allocated into the victim entry. Hence, in one embodiment, prior to the allocation of the new data into the victim entry, the record of candidate entries may be retrieved from the victim entry and the conflict detection circuitry may be arranged to perform the final stage detection operation using that record of candidate entries as one of its inputs. Whilst in one embodiment the conflict detection circuitry may perform the final stage detection operation as soon as the portion of the new data required for conflict detection is available, in one embodiment the conflict detection circuitry is arranged to perform the final stage detection operation when the new data is available for allocating into the victim entry. As used herein, the term 'allocation' refers to the step performed once the entirety of the new data is available, and accordingly the victim entry can be fully populated. In some embodiments, some of the new data information may be stored within the victim entry earlier in the process, whilst some of the new data is still awaited, and in such embodiments allocation takes place when the entirety of the new data is available and accordingly the victim entry can be fully populated.

The storage structure can take a variety of forms, but in one embodiment is an address translation storage (for example a TLB) and each entry is arranged to store address translation data used to convert a virtual address into a corresponding physical address within a page of physical memory, the address translation data comprising at least a virtual address indication, a corresponding physical address indication, and a page size indication for the page in physical memory that the address translation data relates to.

In such an embodiment where the storage structure is an address translation storage, the lookup circuitry can be arranged to be responsive to an address translation request specifying a virtual address, to perform a lookup operation within the storage structure to compare the specified virtual address with the virtual address indication stored in the entries of the storage structure in order to determine whether a hit condition is detection identifying that the address translation data required by the address translation request is stored within one of the entries of the storage structure. In such an embodiment, the portion of the new data required for conflict detection may comprise the page size indication, the page size indication identifying which bits of the virtual address indication are performed with corresponding bits of the specified virtual address in order to determine whether the hit condition is present.

In one such embodiment, during performance of the lookup operation in respect of an entry, a first subset of the bits of the virtual address indication are compared with corresponding bits of the specified virtual address irrespective of the page size indication, and zero or more additional bits selected in dependence on the page size indication form a further subset of the bits of the virtual address indication to be compared with corresponding bits of the specified virtual address. The conflict detection circuitry is then arranged to perform said at least one initial stage detection operation to determine, based on a comparison of said first subset of the bits of the virtual address indication for the new data with the first subset of the bits of the virtual address indication in the entries of the storage structure, the candidate entries whose data may conflict with the new data.

As mentioned earlier, in one embodiment existing components within the lookup circuitry can be used to perform the at least one initial stage detection operation.

The final stage detection operation performed by the conflict detection circuitry can take a variety of forms. In one embodiment, the conflict detection circuitry is arranged, once the page size indication is available for the new data, to determine said further subset of the bits and to perform said final stage detection operation to determine, based on a comparison of said further subset of the bits of the virtual address indication for the new data with the further subset of the bits of the virtual address indication in the entries of the storage structure, whether any of the candidate entries do contain data that conflicts with the new data. Hence, in this embodiment, the comparison of any required further bits of the virtual address indication is performed during the final stage detection operation, with that information being combined with the earlier determined candidate entries information in order to determine whether any conflicts do in fact exist.

In an alternative embodiment, the conflict detection circuitry is further arranged to perform said at least one initial stage detection operation to determine, for each possible page size, the corresponding bits for the further subset, and to perform an additional comparison operation in respect of the further subset for each possible page size in order to determine, for each possible page size, a list identifying any of the candidate entries that will contain data that conflicts with the new data if the new data relates to that possible page size. The conflict detection circuitry is then arranged, once the page size indication is available for the new data, to perform said final stage detection operation to select, based on the page size indication, the corresponding list determined during performance of said at least one initial stage detection operation.

Hence, in this embodiment, additional comparisons are performed during the at least one initial stage detection operation in order to determine lists of conflicting entries for each possible page size of the new data. As a result, no additional comparisons are required once the page size indication is available for the new data, and instead the final stage detection operation can merely select the relevant list of conflicting entries based on the page size information. Hence, whilst this latter embodiment requires more comparisons to be performed, since comparisons have to be performed for each potential page size, it avoids the need for any additional comparisons to be performed when the page size indication is available for the new data, and hence may provide further performance improvements in certain embodiments, albeit at the expense of having to perform more comparison operations.

In one embodiment, in the event of a miss condition being detected during performance of the lookup operation, the allocation circuitry is arranged to select the victim entry and to store within a first portion of the victim entry a virtual address indication determined from the specified virtual address. Hence, in this embodiment, the virtual address indication is populated within the victim entry at the time the victim entry is identified, but prior to the allocation operation being performed in respect of the victim entry.

In such an embodiment, the conflict detection circuitry may be arranged to temporarily store the indication of the candidate entries whose data may conflict with the new data in a second portion of the victim entry non-overlapping with said first portion, until the conflict detection circuitry performs the final stage detection operation.

It has been found that in typical embodiments, even when the virtual address indication is populated in the victim entry at the time the victim entry is selected, there is still sufficient spare storage space available within the victim entry to store the indication of the candidate entries whose data may conflict with the new data. That data can hence be retained in the victim entry until such time as it is desired to allocate the victim entry in order to store the entirety of the new data within the victim entry.

In particular, in one embodiment, once the portion of the new data required for conflict detection is available, the conflict detection circuitry is arranged to read from the second portion of the victim entry the indication of the candidate entries whose data may conflict with the new data prior to the new data being allocated into the victim entry, and to perform said final stage detection operation to determine whether any of the candidate entries do contain data that conflicts with the new data.

The storage structure can take a variety of forms, but in one embodiment is a translation lookaside buffer (TLB). In one particular embodiment, the storage structure is a micro-TLB (µTLB), which may typically be arranged as a fully associative storage structure. However, if desired, the techniques of the described embodiments may also be implemented within a main TLB. The main TLB is arranged to receive any request propagated by the µTLB in the event of a miss being detected in the µTLB. The main TLB can be arranged in a variety of ways, but in one embodiment may be a set associative structure. In such an embodiment, the conflict detection process needs to be performed in respect of the relevant set of the set associative structure, such that once a victim entry has been selected within a particular set (typically using a certain number of most significant bits of the virtual address as the TAG value to identify the set), conflict detection is performed in respect of the various other entries within that set with reference to the relevant remaining bits of the virtual address.

Particular embodiments will now be described with reference to the Figures.

FIG. 1 schematically illustrates a data processing system including a processor core 10 for executing program instructions and for performing data accesses (both instruction fetches and accesses to data to be manipulated) using virtual addresses VA. These virtual addresses are subject to address translation to physical addresses PA using address translation data provided to the processor core 10 from the µTLB 20. The physical addresses are used to control access to instructions and data in a memory system 15. The memory system 15 may comprise a memory hierarchy, such as multiple levels of cache memory and a main memory or other non-volatile storage.

The µTLB 20 has a plurality of entries, where each entry stores address translation data for use when converting a virtual address into a corresponding physical address within the memory system. The address translation data typically identifies a virtual address indication for a virtual page, a corresponding physical address indication for the physical page, a page size indication, and optionally may also include one or more other attributes, such as whether the associated page in physical memory is read only, writeable, whether the data within that page is cacheable, etc.

When the processor core 10 issues a request to the µTLB 20 specifying a virtual address, a lookup operation is performed within the µTLB to see whether the address translation data required to convert that virtual address into a physical address is contained within one of the entries of the µTLB. If not, then a miss indication will be generated, and this will cause the request to be propagated on to a main TLB 25. The main TLB is typically significantly larger than the µTLB, and provides a larger repository for buffering address translation data. A lookup operation will hence be performed within the main TLB to determine whether the required address translation data is within the main TLB, and if it is that address translation data will be returned to the µTLB as a response, which will then enable the µTLB to issue a response back to the processor core 10 providing the required address translation data. Typically the µTLB will also allocate that data from the main TLB into one of the µTLB's entries, so that it is available should another virtual address be issued by the processor core relating to the same page in memory.

If a miss is detected within the main TLB, then a page table walk process is invoked in order to walk through a series of page tables 30 within the memory system 15 in order to access a sequence of descriptors, with the information from those descriptors being used to produce the required address translation data. That address translation data can then be stored within the main TLB 25, and propagated on as a response to the µTLB 20.

Page table walk operations typically involve a series of sequential accesses to page tables within memory, and as such can incur significant latency in the processing of access requests issued by the processor core 10. The use of the main TLB 25 and the µTLB 20 hence enable significant performance benefits to be realised, by enabling frequently used address translation data to be cached for quick access by the processor core.

Once the processor core has retrieved the required address translation data from the µTLB, it can then output the request to the memory system 15 specifying the required physical address, in order to access instructions, and/or data to be manipulated when executing those instructions.

The µTLB 20 is in one embodiment arranged as a relatively small, fully associative, storage structure, as it is desirable to arrange the µTLB 20 to operate with relatively high performance, and with a low area cost. The main TLB 25 is typically significantly larger, and only needs to be accessed if there is a miss in the µTLB. Since it is used less frequently than the µTLB, it does not need to operate with quite as a high a performance as the µLB. The main TLB can be arranged in a variety of ways, but in one embodiment is a set associative structure.

It is important that, when entries are allocated into the µTLB, or indeed into the main TLB, it is determined that there are no other entries whose data could cause conflict with the data being allocated into the new entry. In particular, when performing a lookup within either the µTLB (or the main TLB), it should only be possible to obtain at most a hit with one entry subjected to the lookup operation. In a fully associative structure, all of the entries storing valid data will be subjected to the lookup operation, whereas in a set associative structure only the entries within the identified set containing valid data will be subjected to the lookup operation.

In accordance with the embodiments described herein, a novel conflict detection mechanism 22 is provided within the µTLB 20 to provide a high performance, low area, technique for implementing the required conflict detection processes. The main TLB will also include a conflict detection mechanism. Within the main TLB, any desired mechanism could be used, but in one particular embodiment the main TLB may also use the novel conflict detection mechanism of the described embodiments.

Figure 2:
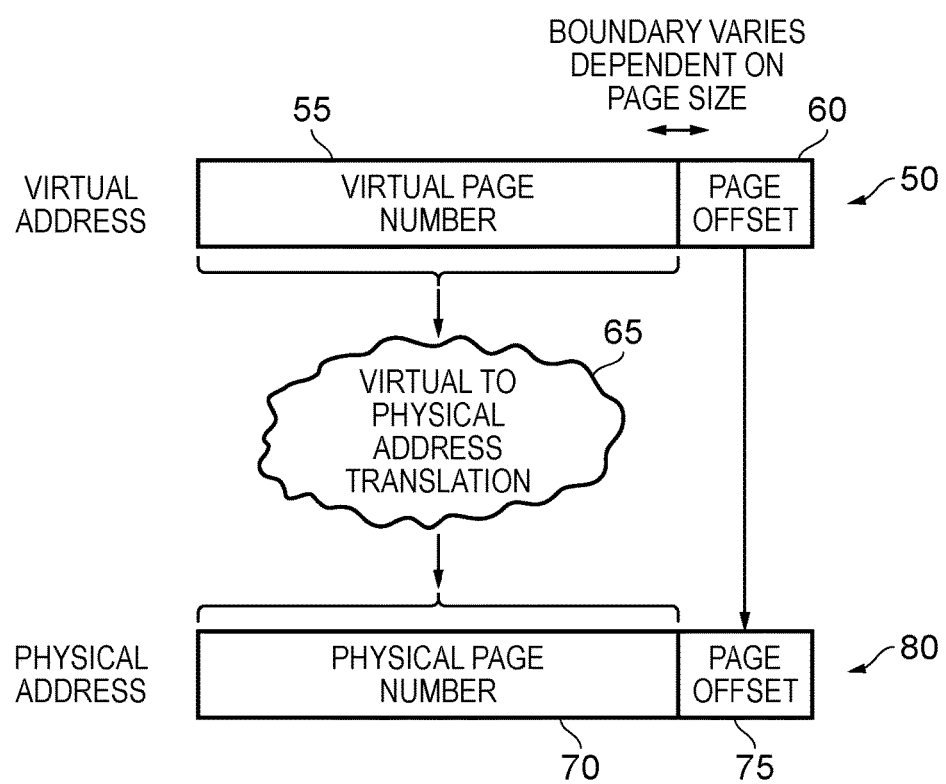
FIG. 2 is a diagram schematically illustrating a virtual to physical address translation process.

FIG. 2 is a diagram schematically illustrating the address translation process. A virtual address 50 can be considered to comprise a number of bits 55 identifying a virtual page number, and some other bits 60 identifying a page offset. The number of bits forming the virtual page number and the number of bits forming the page offset will depend on the page size of the associated page in memory. The address translation operation is illustrated schematically by the element 65 shown in FIG. 2, and serves to obtain address translation information sufficient to enable the virtual page number bits 55 to be translated into equivalent bits 70 of a physical address 80 identifying a physical page number. The page offset bits are not altered, and accordingly the page offset bits 75 are directly determined from the page offset bits 60 in the virtual address.

Figure 3:
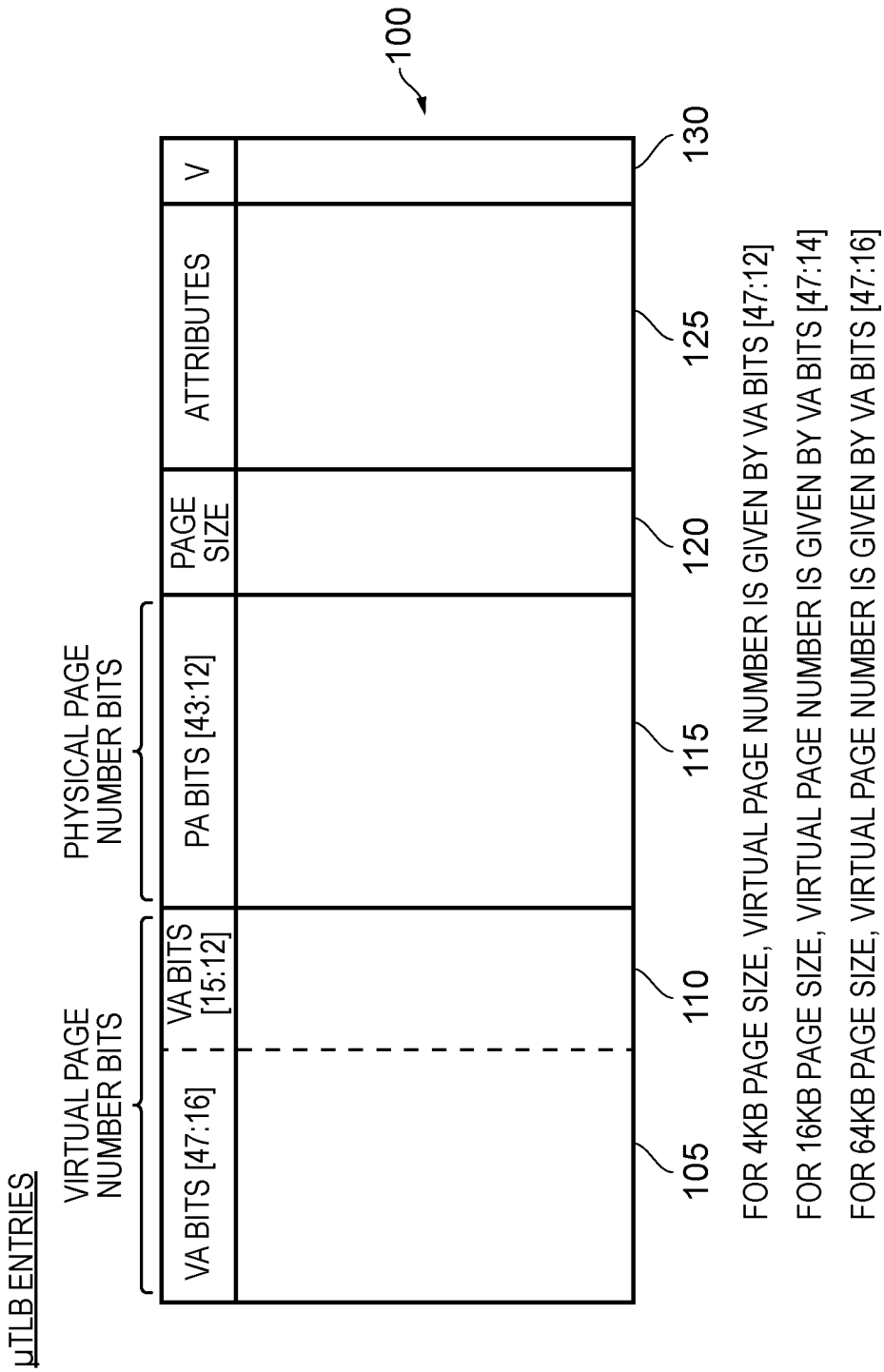
FIG. 3 is a diagram schematically illustrating fields provided within each entry of a micro-TLB (µTLB) in accordance with one embodiment.

FIG. 3 is a diagram schematically illustrating fields provided within each entry of the µTLB in accordance with one embodiment. Virtual page number bits are provided within the fields 105, 110. Essentially these form a single field, but FIG. 3 illustrates that a certain number of the most significant bits will always form the most significant bits of the virtual page number, irrespective of which of multiple different supported page sizes the entry relates to. However, how many additional virtual address bits are needed, if any, to identify the virtual page number, will depend on the page size. As illustrated in FIG. 3, in one embodiment there are three supported page sizes, namely 4 Kbytes, 16 Kbytes and 64 Kbytes. For a 4 Kbyte page, the virtual page number is given by all of the virtual address bits down to bit 12. In this example, it is assumed that a virtual address is 48 bits in length, and accordingly bits 47 to 12 specify the virtual page number for a 4 Kbyte page. The page offset bits are then formed by bits 11 to 0. However, for a 16 Kbyte page, the virtual page number is given by the virtual address bits 47 to 14, with bits 13 to 0 representing the page offset. Similarly, for a 64 Kbyte page, the virtual page number is given by virtual address bits 47 to 16 with bits 15 to 0 representing the page offset.

In addition to the fields 105, 110 storing the virtual page number bits, a field 115 is provided storing the corresponding physical page number bits. Whilst physical addresses may be specified using the same number of bits as virtual addresses, in the particular embodiment illustrated in FIG. 3 it is assumed that physical addresses are 44 bits in length. Assuming fields 105, 110 store VA bits down to bit position 12, the physical page number bits stored in the field 115 will in one embodiment also contain PA bits down to bit 12.

As also shown in FIG. 3, a page size field 120 is provided to identify the size of the page associated with the entry, and in addition one or more further fields 125 can be used to store additional attributes, such as the access rights, cacheability information, etc. discussed earlier. Finally, a valid field 130 will be provided to identify whether the entry stores valid address translation data or not.

In the embodiments described herein, the valid field can indicate whether the entry is invalid, whether the entry is valid, meaning that the entry stores valid address translation data, or whether the entry is 'qualified valid', indicating that that entry has been identified as a victim entry into which new address translation data is to be allocated, but that new data has not yet been allocated into the entry.

If an entry is marked as qualified valid, this means that a hit cannot be detected in respect of that entry during a lookup operation, since, even if the virtual address field 105, 110 has been populated, the remaining fields do not hold valid address translation data as yet, since that information is still awaited. Only when that information is available will the entry be allocated, and the valid flag changed from qualified valid to fully valid. In addition to not being able to detect a hit in respect of a qualified valid entry, in one embodiment a qualified valid entry can also not be reallocated, i.e. that entry cannot be selected as a victim entry for a subsequent allocation, since that entry is pending receipt of data to allocate into it.

Figure 4:
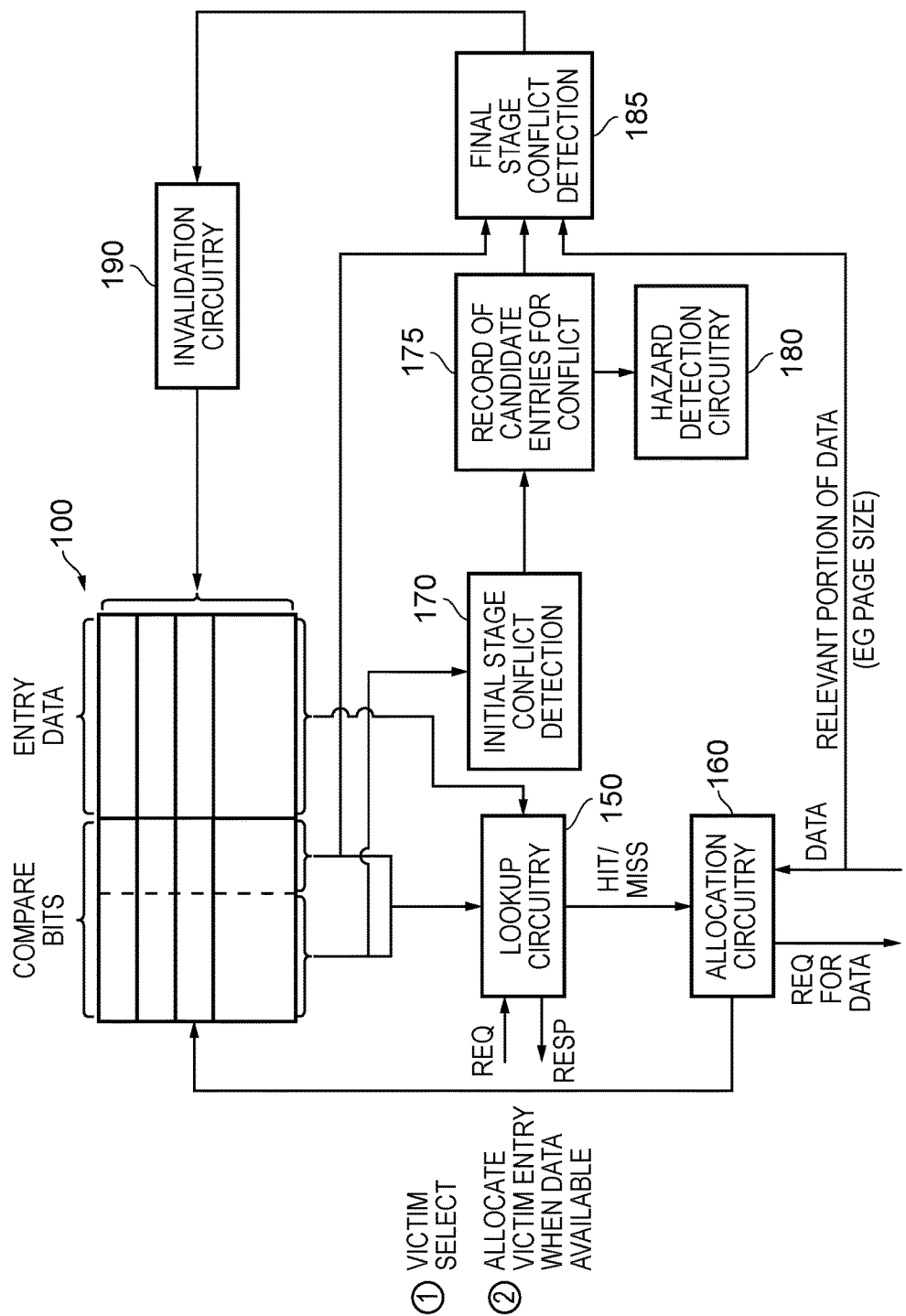
FIG. 4 is a block diagram illustrating components provided within the µTLB in accordance with one embodiment.

FIG. 4 is a block diagram of components provided within the µTLB 20 in accordance with one embodiment. The µTLB entries are represented by the storage block 100 and each entry includes both compare bits and entry data. In particular, the compare bits are the virtual page number bits provided within the fields 100, 105, and the entry data is formed by the remaining fields discussed earlier with reference to FIG. 3. The compare data and the entry data collectively form the address translation data.

When the processor core issues a request specifying a virtual address, this is received by the lookup circuitry 150, which performs a lookup operation in respect of all of the valid entries to determine whether the virtual address matches with the virtual address bits of a valid entry. The page size information of an entry is used to determine how many bits of the virtual address are compared with corresponding virtual address indication bits within the entry. If a hit is detected, then the entry data for the hit entry is retrieved by the lookup circuitry, and a response is returned to the processor core providing the required address translation data.

In the event of a miss being detected, the allocation circuitry 160 is used to apply a victim selection policy in order to identify a victim entry whose contents are to be overwritten by new address translation data. Any victim allocation policy can be used, for example a round robin scheme, least recently used scheme, etc. Once the victim entry has been selected, then a request for the address translation data can be issued to the main TLB 25, and when that data is subsequently returned, it can be allocated into the victim entry.

As shown in FIG. 4, conflict detection is split into multiple parts. Initial stage conflict detection circuitry 170 receives the common virtual address indication bits that will be compared with the corresponding virtual address bits of the request, irrespective of the page size associated with the corresponding entry. The initial stage conflict detection circuitry then compares those selected address bits with the corresponding address bits of the request, in order to produce an output indicating whether there is a potential conflict between the data that is going to be allocated into the victim entry, and the data held in any of the other entries. In one embodiment, this information can be provided as a vector, where each bit is associated with one of the entries within the storage structure 100 and is set to 1 or 0 depending on whether an address match is detected or not. Since the address match is only comparing part of the virtual page number bits, namely the range of bits that will be common to all page sizes, this information does not identify definitively that there will be a conflict, but does flag entries that could potentially give rise to a conflict. Whether there is in fact a conflict or not is dependent on the page size associated with the new address translation data that is going to be allocated into the victim entry, since this determines whether any additional VA bits need to be compared.

In one embodiment, at the time the initial stage conflict detection circuitry operates, that page size information for the new address translation data is not known, and accordingly a record of the candidate entries for conflict is kept within storage 175 until such time as the data is returned from the main TLB to the allocation circuitry 160. At that point, the page size information is available, and is provided as an input to the final stage conflict detection circuitry 185. The final stage conflict detection circuitry 185 also receives the remaining compare bits of the virtual address indications and, based on the page size information, determines how many of those additional virtual address indication bits, if any, need to be compared with the corresponding virtual address bits of the request. Any such additional comparisons can then be performed by the final stage conflict detection circuitry, with the results used to qualify the record of candidate entries held within the storage 175 in order to determine if any of those candidate entries do in fact give rise to a conflict. If they do, then any such entries are identified to the invalidation circuitry 190, which then invalidates those entries. This ensures that when the new data returned from the main TLB is allocated into the victim entry, there will be no other entries whose data conflicts with the data that has been newly allocated into the victim entry.

In one embodiment, at the time the victim entry is selected, the virtual address fields 105, 110 are populated, and hence the initial stage conflict detection circuitry 170 and the final stage conflict detection circuitry 185 can obtain the relevant virtual address bits of the request directly from the victim entry. Once the victim entry has been selected and the virtual address bits populated in the victim entry, the victim entry is marked as a qualified valid entry to identify that the entry data has not yet been allocated into that victim entry.

As will be discussed in more detail later with reference to FIG. 5, hazard detection circuitry 180 can be provided for detecting potential hazard conditions. In particular, if at the time the vector of candidate entries is produced, it is determined that a bit within that vector associated with a qualified valid entry is set, meaning that the newly assessed request potentially conflicts with a preceding request that is currently pending allocation, then this indicates a potential hazard condition. In one embodiment, in that scenario, the hazard detection circuitry 180 notifies the allocation circuitry 160, which then avoids selecting a victim entry for the more recent request. Instead, it is awaited until the relevant victim entry is no longer qualified valid, and instead is marked as valid indicating that the allocation has been completed, and at that point the later request is effectively replayed by re-performing the lookup process and conflict detection processes. It is possible during the lookup operation that a hit will now be detected, due to the data that has now been allocated into the previous victim entry. However, if not, then a victim entry can now be selected for the new request, and the above described steps performed to detect conflicts, and in due course allocate the retrieved data from the main TLB into the new victim entry.

Figure 5:
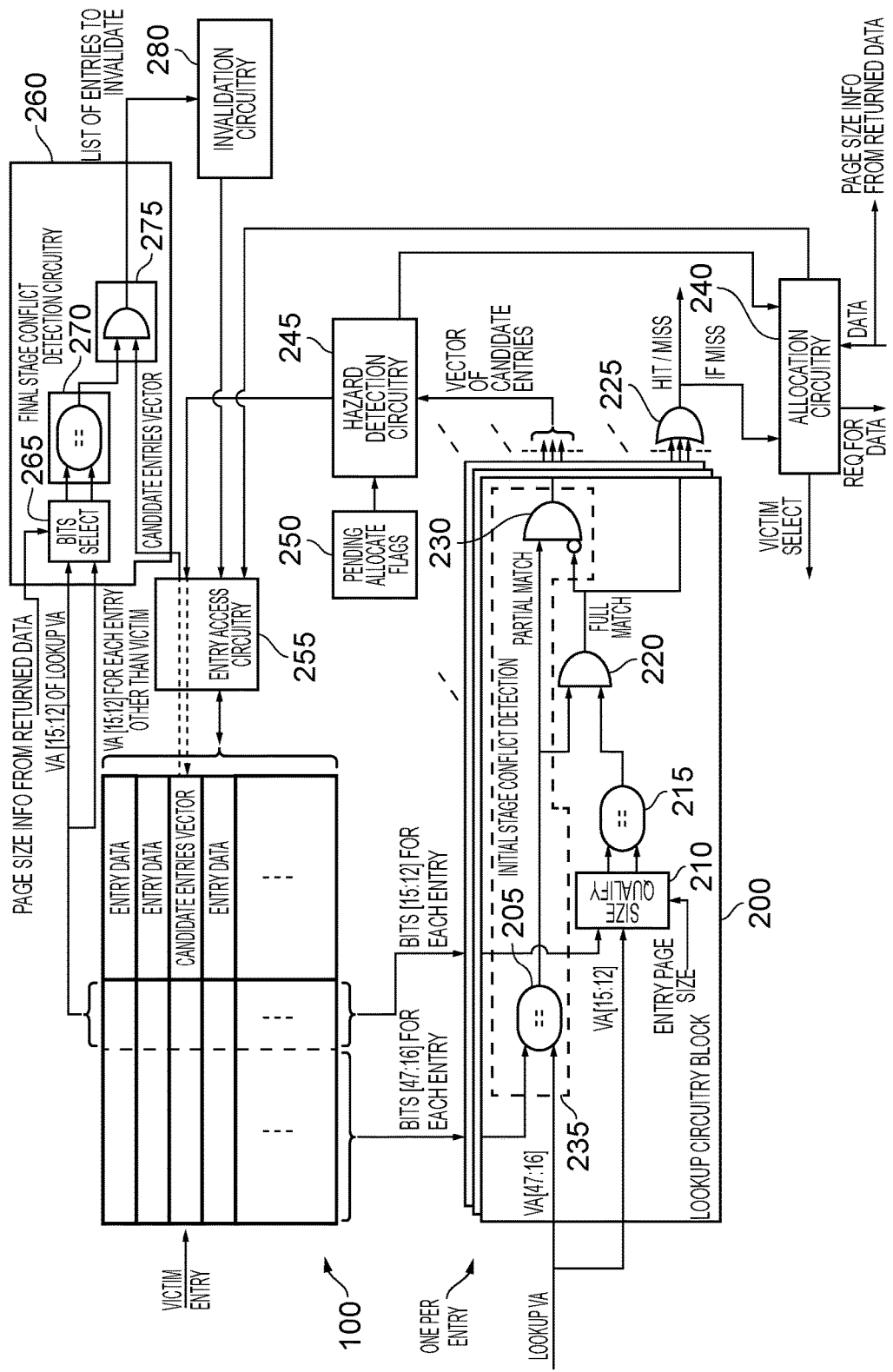
FIG. 5 is a diagram providing a more detailed illustration of the components provided within the µTLB in accordance with one particular embodiment.

FIG. 5 is a diagram illustrating in more detail components provided within the μTLB in accordance with one embodiment. In this embodiment, the initial stage detection circuitry 170 is implemented within the lookup circuitry, and in particular is arranged to reuse the comparison circuitry already provided within the lookup circuitry, hence providing significant area and power consumption benefits.

As shown in FIG. 5, the lookup circuitry comprises multiple lookup circuitry blocks 200, each block being associated with one of the entries within the storage structure 100. Each lookup block receives the virtual address provided with the request from the processor, along with the virtual address bits in the associated entry and the page size information for that entry.

Comparison circuitry 205 performs a comparison of the virtual address bits that are common to all of the supported page sizes, in this example virtual address bits 47-16, and outputs a signal indicating whether all of those bits match, referred to in FIG. 5 as a partial match. The virtual address bits that only need comparing dependent on the page size are routed to the size qualifying component 210, which also receives the page size information from the entry. This selects the appropriate virtual address bits amongst bits 15 to 12 to propagate onto the comparator block 215. For a 4 Kbyte page all 4 bits will be provided to the comparator block 215, for a 16 Kbyte page only bits 15 and 14 will be provided to the comparator block 215, and for a 64 Kbyte page no additional bits will be provided to the comparator block 215, and the comparator block will output a default logic 1 value in that instance.

The AND gate 220 receives the partial match result from the comparison circuitry 205 and the output from the comparison circuitry 215, and hence generates a hit/miss signal for the associated entry. In this embodiment, the hit signal will be indicated by a logic 1 value and a miss signal will be indicated by a logic 0 value. If the associated entry is invalid or qualified valid, no hit signal will be generated by the associated lookup circuitry block 200; a hit can only be generated in respect of a valid entry.

As shown by the OR gate 225, the various hit/miss signals produced by each of the blocks 200 will then logically be combined to generate a hit/miss indication for the storage structure. Due to the conflict detection mechanisms employed, there will at most be only one entry than can detect a hit, and hence only one of the inputs at most to the OR gate 225 will be set at a logic 1 value.

In the event of a hit, the entry data from the hit entry is retrieved, and the lookup circuitry generates a response back to the processor core. However, in the event of a miss, this is signalled to the allocation circuitry 240 to allow for victim selection to take place and for the required data to be requested from the main TLB. However, as will be discussed in more detail below, the allocation circuitry awaits a response from the hazard detection circuitry 245 before implementing either of these steps.

The partial match information is provided to the AND gate 230, which is qualified by an inverted version of the full match signal output by the AND gate 220. Hence, in the event that a full match is not detected, it will be understood that the AND gate 230 will have its lower input set to a logic 1 value, and accordingly the partial match information will be output. In the event of a miss in the storage structure, this partial match information from all of the circuitry blocks will hence form a vector of candidate entries, i.e. an indication of any candidate entries that may potentially give rise to a conflict, based on the comparisons performed in respect of bits 47 to 16.

In the absence of a hit being indicated by the AND gate 225, the hazard detection circuitry 245 determines whether a logic one value has been set within the vector in respect of an entry that is currently marked as qualified valid, optionally a record of this information being kept within the pending allocate flag storage 250. Provided this is not the case, then there is no potential hazard, and the hazard detection circuitry 245 notifies the allocation circuitry that it can proceed with its victim selection and data request processing. Further, the vector of candidate entries is propagated on to the entry access circuitry 255, and once the victim entry is selected, that candidate entries vector will be stored within the entry data field of the victim entry. As discussed earlier, when the victim entry is selected, the virtual address fields are also populated with bits 47 to 12 of the lookup virtual address. That victim entry is then marked as a qualified valid entry pending allocation later taking place when the data is returned from the main TLB.

However, if the hazard detection circuitry 245 detects that a logic 1 value is set within the vector for a qualified valid entry, then it notifies the allocation circuitry 240 to not perform victim selection or to request the data, hence effectively stalling processing of the request from the processor.

In due course, once the data for the qualified valid entry is returned, and allocated into the entry causing that entry to then become a fully valid entry, the lookup operation is replayed using the lookup circuit blocks 200. In particular, it is possible at this point that a hit may be detected with regards to the entry that has just been allocated, and if that is the case then the address translation data requested by the processor core can be returned directly to the processor core. If instead a miss is still detected, the vector of candidate entries will again be produced, and this time can be forwarded on to the entry access circuitry 255. Further, the hazard detection circuitry will detect that no further hazard is present, and will further authorise the allocation circuitry to select a new victim, and to request the data from the main TLB.

Once a victim entry has been selected, the virtual address bit field has been populated, and a candidate entries vector has been stored within the entry data, then the data from the main TLB is awaited. When the data from the main TLB has been received, the page size information can be forwarded to the final stage conflict detection circuitry 260, which can also be arranged to receive virtual address bits 15 to 12 from each entry. From the victim entry, bits 15 to 12 will specify the virtual address bits of the lookup virtual address. Based on the page size information, the bits select circuitry 265 determines how many, if any, of virtual address bits 15 to 12 need to be subjected to a comparison, and then forwards those bits to the comparison circuitry 270 (which may comprise one comparison block for each entry) to enable the relevant bits of the lookup virtual address to be compared with the corresponding bits of the other entries within the storage structure 100. The candidate entries vector is also retrieved from the victim entry and provided to the AND gate circuitry 275 (which may comprise an AND gate for each entry), along with the output from the comparison circuitry 270. As a result, the output from the AND gate circuitry 275 is a list of entries to invalidate, and that information is provided to the invalidation circuitry 280. The invalidation circuitry can then communicate via the entry access circuitry 255 to cause the valid fields of the relevant entries to be cleared in order to mark those entries as invalid.

Once the candidate entries vector has been retrieved by the final stage conflict detection circuitry 260, the allocation circuitry 240 can then perform the allocation process in respect of the victim entry, and in particular forwards the address translation data to the entry access circuitry 255, from where it is then written into the victim entry in order to fully populated the victim entry with the address translation data. At this point, the valid status is changed from qualified valid to fully valid in respect of the victim entry.

Figure 6:
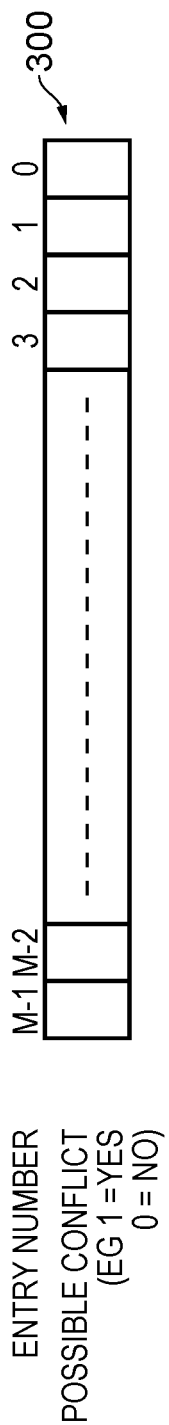
FIG. 6 is a diagram illustrating the format of the vector of candidate entries generated by the lookup circuitry in accordance with one embodiment.

FIG. 6 schematically illustrates the format of the vector of candidate entries in accordance with one embodiment. In particular, this vector 300 comprises a sequence of bits, where each bit is associated with a corresponding entry. Accordingly, where the storage structure 100 has M entries, the vector may be an M-bit vector, with each bit being associated with one of those entries. When a bit has a first value, for example a logic one value, this indicates that the corresponding entry is a potential conflict, whereas if the bit has a second value, for example a logic zero value, this indicates that the corresponding entry is not a conflict.

Figure 7A:
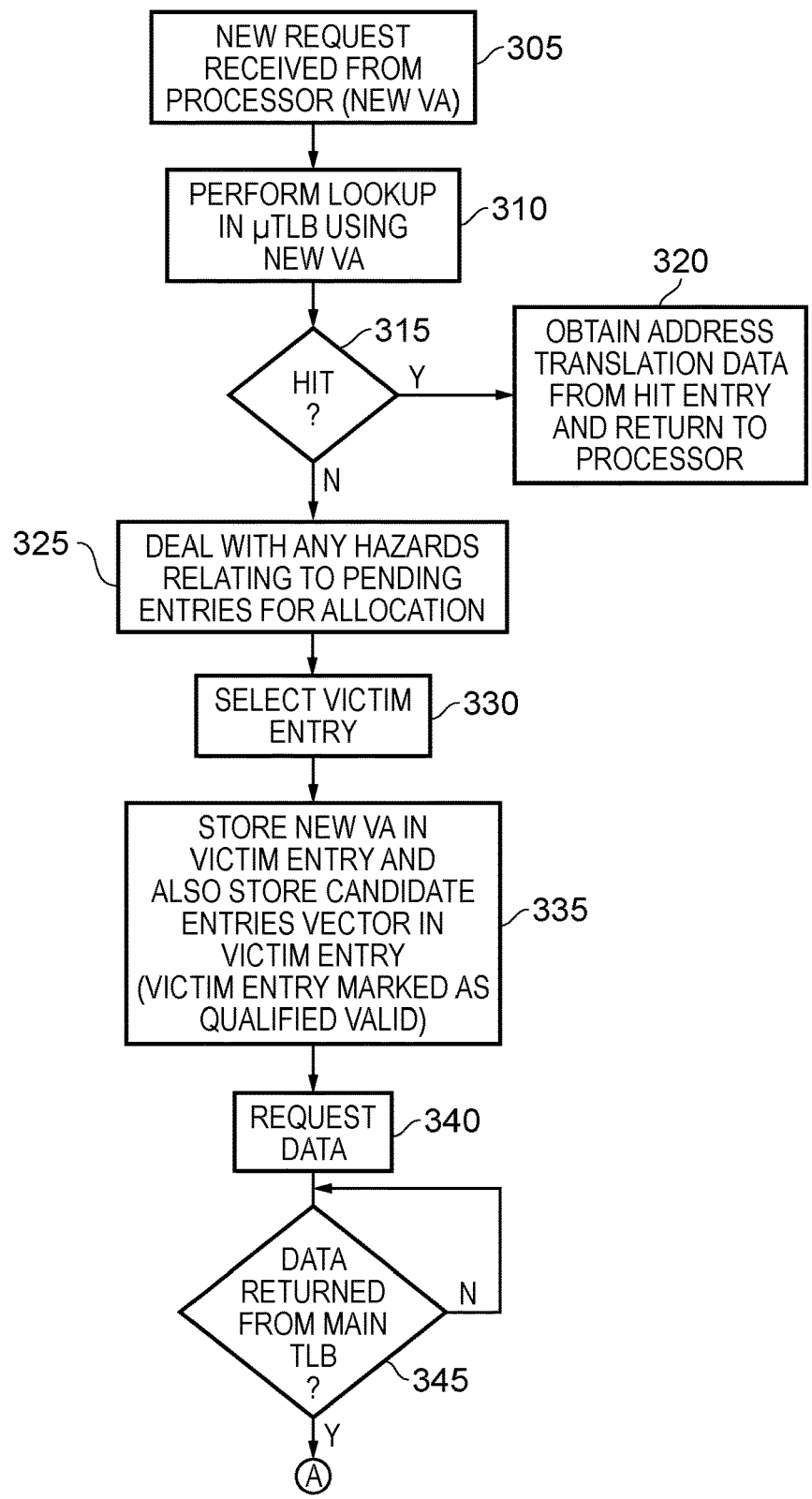
FIGS. 7A and 7B provide a flow diagram illustrating the operation of the circuitry of FIG. 5 in accordance with one embodiment.
Figure 7B:
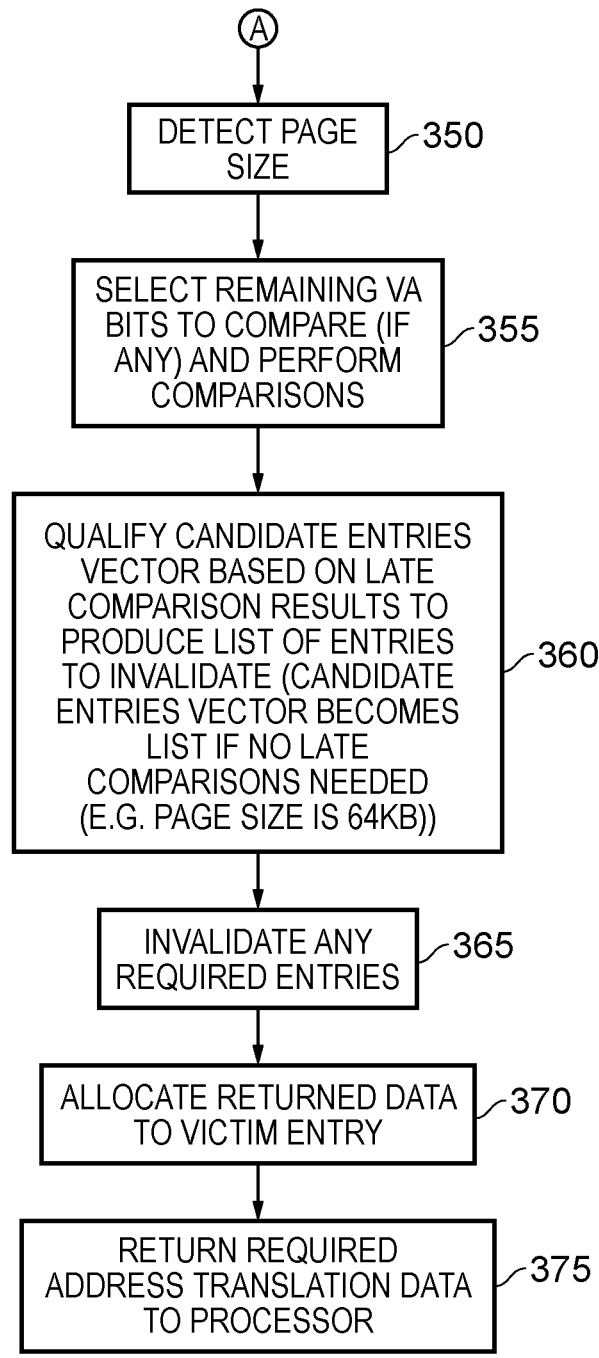

FIGS. 7A and 7B provide a flow diagram illustrating the operation of the circuitry of FIG. 5 in accordance with one embodiment. At step 305, a new request is received from the processor, specifying a virtual address. Thereafter, at step 310, a lookup is performed in the μTLB using the new virtual address, the lookup operation being performed by the lookup circuitry blocks 200 of FIG. 5.

At step 315, it is determined whether a hit is detected within the storage structure 100, and if so the process proceeds to step 320 where the address translation data is obtained from the hit entry, and returned to the processor.

However, if a hit is not detected, then as discussed earlier a vector of candidate entries will be output by the lookup circuitry blocks 200, and received by the hazard detection circuitry 245. At step 325, the hazard detection circuitry deals with any hazards relating to other pending entries for allocation, using the process discussed earlier. In particular, the hazard detection circuitry identifies whether any bit in the vector associated with a qualified valid entry is set, and if so causes the allocation circuitry to stall the victim selection process, and the propagation of a request to the main TLB. Once in due course any such qualified valid entry has been turned into a fully valid entry, following the allocation of the address translation data into that entry, the lookup process will effectively be replayed to determine whether there is now a hit, or whether there is still a miss. If there is still a miss, but this time no potential hazards are detected with respect to qualified valid entries, then the process can proceed to step 330. The process can also proceed directly to step 330 if no hazards are detected by the hazard detection circuitry at step 325.

At step 330, the allocation circuitry selects a victim entry using any appropriate victim selection scheme, and then at step 335 the new virtual address is stored in the victim entry. Also, at this time, the candidate entries vector is stored in that victim entry, and the victim entry is marked as qualified valid.

The process then proceeds to step 340, where the allocation circuitry requests the address translation data from the main TLB, whereafter at step 345 it is determined whether the data has been returned from the main TLB.

Once the data has been returned from the main TLB, then the page size information within that address translation data is detected at step 350, and at step 355 that page size information is used by the final stage conflict detection circuitry 260 to select the remaining virtual address bits, if any, to be compared. As discussed earlier, this functionality can be performed by the bits select circuitry 265. Following selection of any appropriate bits, the remaining comparisons are then performed using the comparison circuitry 270 of the final stage confliction detection circuitry 260.

At step 360, the candidate entries vector is retrieved from the victim entry and that vector is qualified based on the late comparison results now obtained by the comparison circuitry 270 in order to produce a list of entries to invalidate. If no late comparisons are required to be performed by the comparison circuitry 270, then the candidate entries vector becomes the list of entries to invalidate. For example, if it is determined that the page size of the new data being allocated is 64 Kbytes, then in the specific example discussed earlier no additional comparisons will be required, and the candidate entries vector becomes the list of entries to be invalidated.

At step 365, any required entries are invalidated under the control of the invalidation circuitry 280, and at step 370 the returned data from the main TLB is allocated to the victim entry by the allocation circuitry 240. In addition, at step 375, the required address translation data is returned to the processor.

Figure 8:
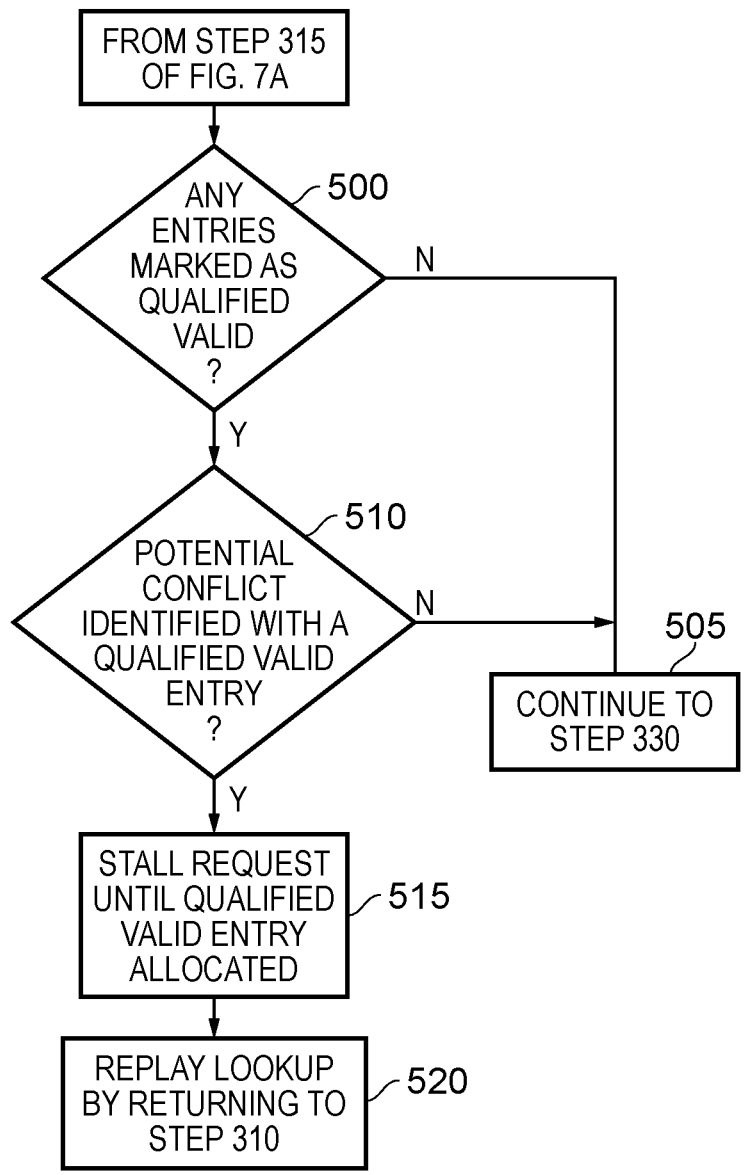
FIG. 8 is a flow diagram illustrating steps that may be performed in accordance with one embodiment to implement step 325 of FIG. 7A.

FIG. 8 is a flow diagram schematically illustrating steps that may be performed in order to implement step 325 of FIG. 7A in accordance with one embodiment. The process begins by following the no path from step 315 of FIG. 7A, whereafter at step 500 it is determined whether there are any entries marked as qualified valid within the storage 100. If not, then the process can continue to step 330, as indicated by step 505 of FIG. 8.

However, if the storage does contain at least one entry that is marked as qualified valid, then at step 510 it is determined whether a potential conflict is identified with such a qualified valid entry, by analysis of the vector of candidate entries produced by the lookup circuitry blocks 200. If not, then again the process continues to step 330, but otherwise the process proceeds to step 515 where the request is stalled until the qualified valid entry, or qualified valid entries, that have been identified as potential conflict have had data allocated to them, and accordingly are no longer qualified valid, but instead are valid entries. Thereafter, at step 520 the lookup process is replayed by returning to step 310. As discussed earlier, it is possible that a hit will now be detected, given the address translation data that has now been allocated, but if a miss is still detected, then a new vector of candidate entries will be produced, and the process can continue in the normal way.

Figure 9:
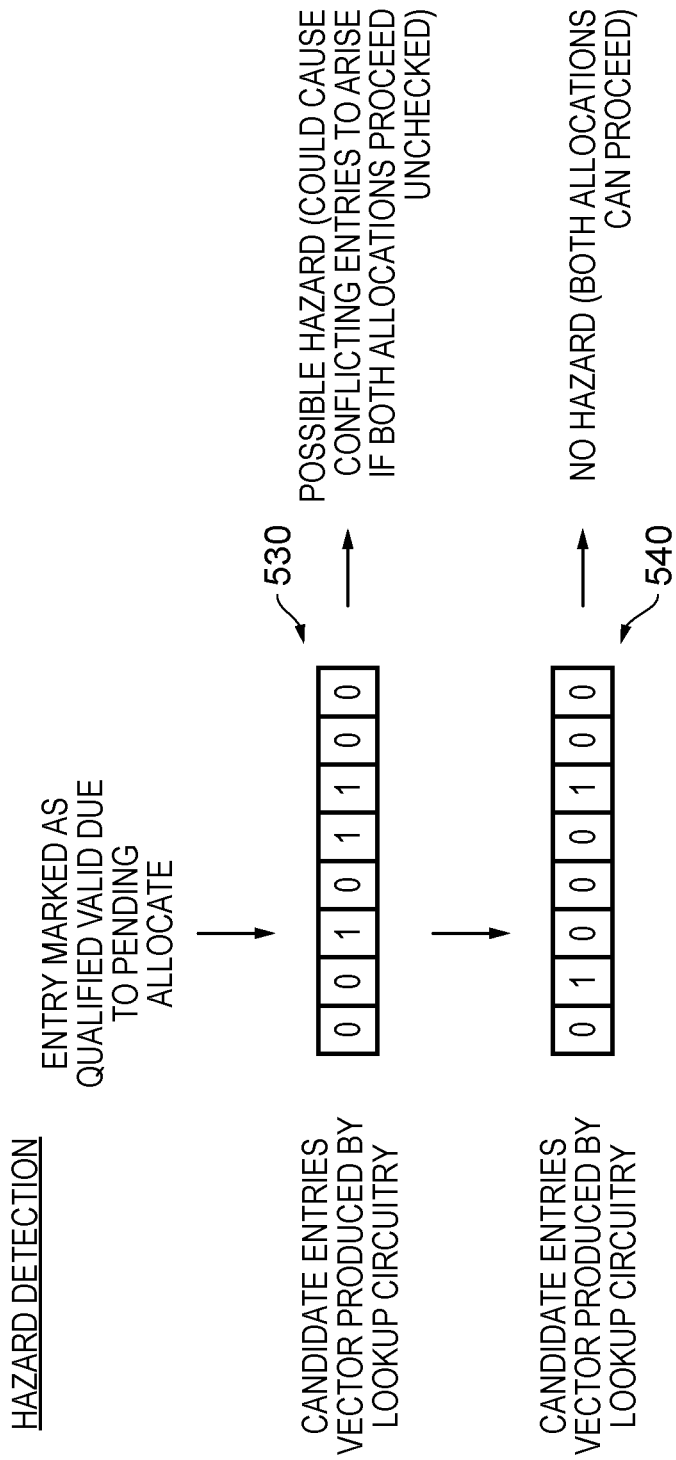
FIG. 9 illustrates two example forms of the candidate entries vector, one of which may give rise to detection of a possible hazard whilst the other may not, for an example where a specific entry is marked as "qualified valid" due to a pending allocate operation being in progress.

FIG. 9 schematically illustrates the hazard detection process performed by the hazard detection circuitry 245 for two example vectors of candidate entries. For ease of illustration, it is assumed that the storage structure 100 has eight entries, but it will be appreciated that in any particular embodiment the storage structure may have more or less than eight entries. In the example shown in FIG. 9, it is assumed that the sixth entry is marked as qualified valid due to there being a pending allocate operation being performed in respect of that entry. With regard to the candidate entries vector 530, this has the bit associated with that entry marked as set, indicating that there could be a possible hazard with that entry. This could cause conflicting entries to arise if both allocations were to proceed unchecked. However, as discussed earlier, in accordance with one embodiment the later access request that gave rise to the generation of the candidate entries vector 530 is stalled, and the lookup process is replayed once the sixth entry is no longer marked as qualified valid, and instead has become a valid entry following allocation of data to it.

In the second example candidate entries vector 540, the bit associated with the sixth entry of the storage structure is not set, and accordingly there is no potential hazard condition, and the process can proceed without further delay.

Figure 10A:
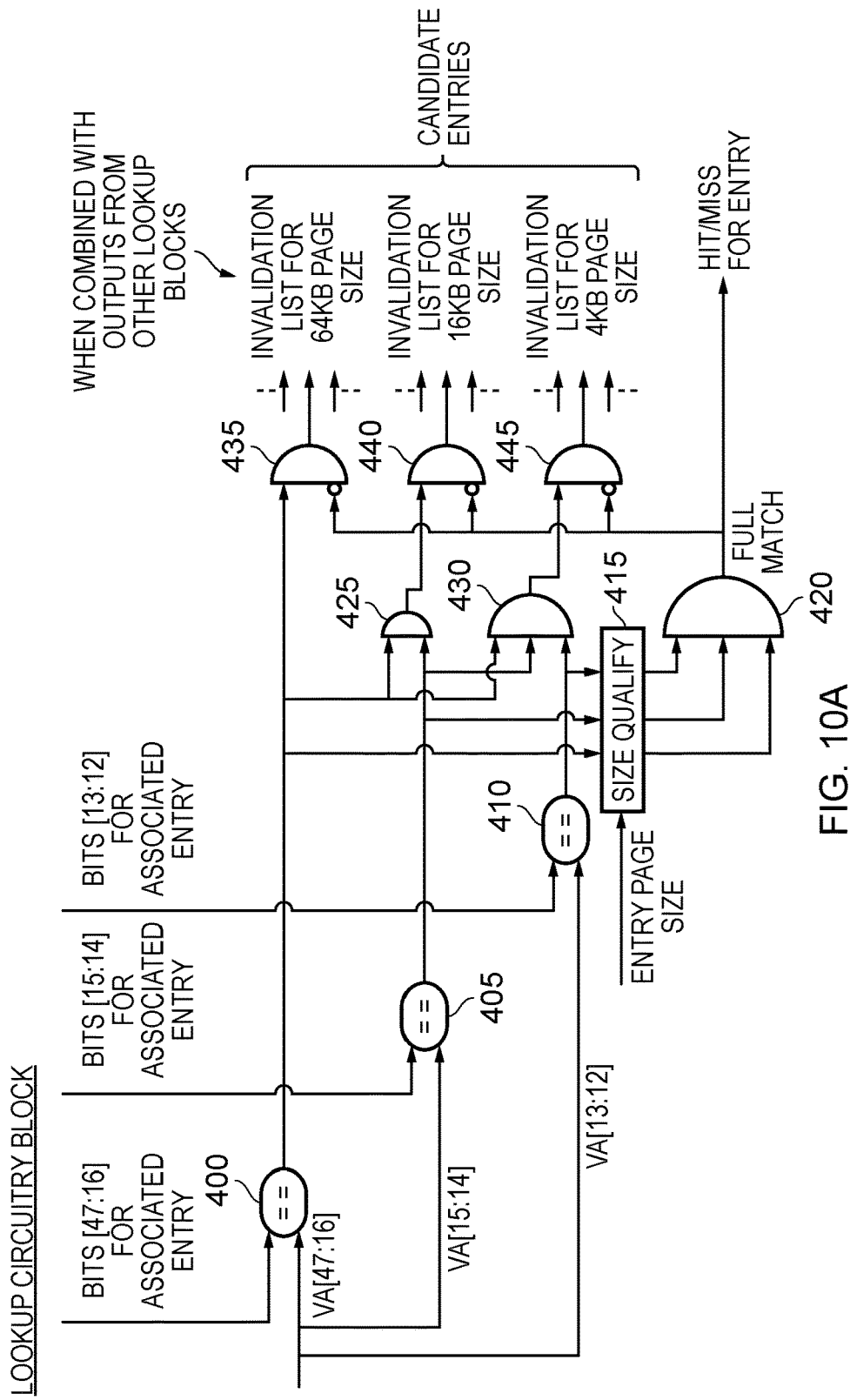
FIG. 10A schematically illustrates components provided within a lookup circuitry block in accordance with an alternative embodiment.
Figure 10B:
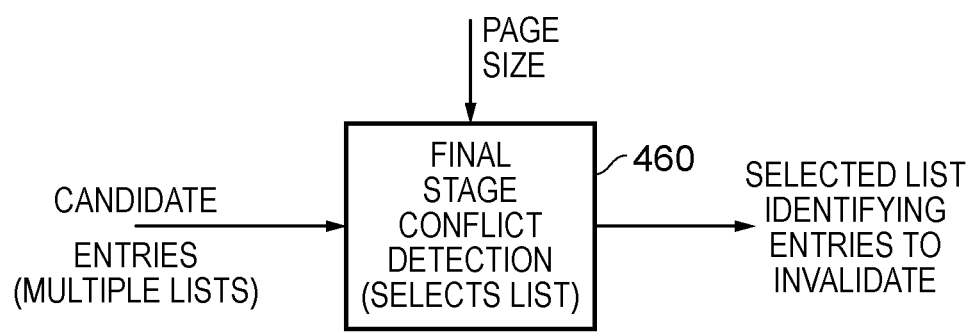
FIG. 10B illustrates the operation of the final stage conflict detection circuitry in one embodiment where each lookup circuitry block takes the form illustrated in FIG. 10A.

In the example discussed with reference to FIG. 5, the final stage conflict detection circuitry 260 may be required to perform some late comparisons using the comparison circuitry 270, once the page size information is available from the information returned from the main TLB. FIGS. 10A and 10B illustrate an alternative embodiment where all of the comparisons are performed upfront, and the structure of the final stage conflict detection circuitry is simplified. In particular, FIG. 10A schematically illustrates components provided within each lookup circuitry block in accordance with an alternative embodiment. The comparison circuitry 400 corresponds with the comparison circuitry 205 discussed in FIG. 5, and hence performs a comparison of bits 47 to 16 as specified by the request with bits 47 to 16 of the associated entry. However, the comparison functionality 215 of FIG. 5 is split into two separate comparison components 405, 410 with the comparison component 405 comparing bits 15 to 14 of the specified virtual address with bits 15 to 14 of the associated entry, and the comparison component 410 comparing bits 13 to 12 of the specified virtual address with bits 13 to 12 of the associated entry.

A size qualifier circuitry 415 is then arranged to receive the page size, and determine which of the comparison outputs from the components 400, 405, 410 need to be routed to the AND gate 420 in order to determine whether a full match is present. For example, if the page size indicates that the associated entry is a 4 Kbyte page, then the output from all of the comparators is routed to the AND gate 420, whereas if the page size indicates that the page is 16 Kbytes, then only the outputs from the comparison blocks 400, 405 are routed to the AND gate 420, and the third input is effectively set to a logic one value, since it does not affect the result. Similarly, if the page size is 64 Kbytes, then only the output from the comparison block 400 is required, and the other two inputs are set to a logic one value so that the full match signal is determined directly from the output of the comparison block 400.

In accordance with this example embodiment, then rather than a vector of candidate entries being produced based solely on the result of the comparison of bits 47 to 16, separate invalidation lists are created for each of the possible page sizes using the outputs from the various comparison components 400, 405, 410. In particular, the AND gate 435 corresponds with the AND gate 230 of FIG. 5, and hence the outputs from the AND gates 435 in each of the lookup circuitry blocks then provides an invalidation list that will be the appropriate list if the new data to be allocated in the victim entry relates to a 64 Kbyte page size.

However, two further AND gates 440, 445 are also provided, which have their lower input controlled by an inverted version of the full match signal, in the same way as the AND gate 230 discussed earlier with reference to FIG. 5. However, the AND gate 440 receives a signal which is produced by the AND gate 425, that AND gate being arranged to receive the output from both the comparison component 400 and the comparison component 405. Accordingly, the outputs from the AND gates 440 in each of the lookup circuitry blocks then provides an invalidation list on the assumption that the page size is 16 Kbytes.

Finally, the AND gate 430 receives the output from each of the comparison components 400, 405, 410, and provides its output as an input to the AND gate 445. As a result, the outputs from the AND gates 445 of each lookup circuitry block provide an invalidation list on the assumption that the page size is 4 Kbytes.

Accordingly, in the event of a miss being detected by the lookup circuitry, then rather than the single vector of candidate entries being produced, three separate vectors are produced, each representing an invalidation list for one of the possible page sizes. That information is then stored until the new address translation data is returned from the main TLB, and in particular the page size for that new address translation data is known. It has been found that in many embodiments, the entry data field of each entry in the storage structure is large enough to accommodate these multiple different vectors, and accordingly the victim entry can still be used to store all of the invalidation list information. However, if insufficient space is provided within the victim entry, additional storage can be provided for storing the invalidation lists if required.

FIG. 10B illustrates the operation of the final stage conflict detection circuitry 460 when the lookup circuitry blocks take the form discussed earlier with reference to FIG. 10A. In particular, once the page size information is returned from the main TLB, that is input to the final stage conflict detection circuitry 460, which can then retrieve the multiple lists representing candidate entries for invalidation. Based on the page size, the final stage conflict detection circuitry 460 then merely selects the appropriate list, and forwards that list to the invalidation circuitry 280. The invalidation circuitry can then invalidate any required entries based on that list.

It will be appreciated that the above described embodiments provides a more efficient mechanism for avoiding conflicting entries in the storage structure, allowing a smaller and more power efficient micro-architecture to be provided. This can give rise to significant performance improvements in a variety of situations, for example significantly reducing the performance cost of a stream of page crossing loads to consecutive addresses. The technique of the described embodiments avoids the need to invalidate all potentially matching entries at the start of the process. Further it can provide power savings by making use of existing comparator hardware within the lookup circuitry.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

We claim:

1. An apparatus comprising:
    a storage structure comprising a plurality of entries, each entry for storing data allocated into that entry;
    allocation circuitry, responsive to a trigger event for allocating new data into the storage structure, to determine a victim entry into which the new data is to be stored, and to allocate the new data into the victim entry upon determining that the new data is available;
    conflict detection circuitry to detect when the new data will conflict with data stored in one or more entries of the storage structure, and to cause the data in said one or more entries to be invalidated;
    the conflict detection circuitry being arranged:
        to perform, prior to a portion of the new data required for conflict detection being available, at least one initial stage detection operation to determine, based on an available portion of the new data, candidate entries whose data may conflict with the new data;
        to maintain a record of the candidate entries;
        to perform, once said portion of the new data required for conflict detection is available, a final stage detection operation to determine whether any of the candidate entries do contain data that conflicts with the new data; and
        to cause invalidation of the data in any entries identified by the final stage detection operation as containing data that conflicts with the new data.

2. An apparatus as claimed in claim 1, further comprising:
    lookup circuitry, responsive to a data request, to perform a lookup operation within the storage structure to determine whether the data required by the data request is stored within one of the entries of the storage structure;
    the conflict detection circuitry employing a portion of the lookup circuitry to perform said at least one initial stage detection operation to determine candidate entries whose data may conflict with the new data.

3. An apparatus as claimed in claim 2, wherein the conflict detection circuitry is arranged to employ said portion of the lookup circuitry to perform said at least one initial stage detection operation whilst the lookup operation is being performed, such that an indication of the candidate entries whose data may conflict with the new data is produced during the lookup operation.

4. An apparatus as claimed in claim 3, wherein in the event of a miss condition being detected by the lookup circuitry, the conflict detection circuitry is arranged to maintain said record of the candidate entries.

5. An apparatus as claimed in claim 4, wherein said miss condition forms said trigger event for allocating new data into the storage structure, causing the allocation circuitry to select said victim entry, and the conflict detection circuitry is arranged to maintain said record of the candidate entries within the victim entry.

6. An apparatus as claimed in claim 1, wherein the conflict detection circuitry is arranged to maintain said record of the candidate entries within a portion of the victim entry prior to the new data being allocated into that portion of the victim entry.

7. An apparatus as claimed in claim 1, wherein the conflict detection circuitry is arranged to perform said final stage detection operation when the new data is available for allocating into the victim entry.

8. An apparatus as claimed in claim 1, wherein the storage structure is an address translation storage, and each entry is arranged to store address translation data used to convert a virtual address into a corresponding physical address within a page of physical memory, the address translation data comprising at least a virtual address indication, a corresponding physical address indication, and a page size indication for the page in physical memory that the address translation data relates to.

9. An apparatus as claimed in claim 8, further comprising:
lookup circuitry, responsive to an address translation request specifying a virtual address, to perform a lookup operation within the storage structure to compare the specified virtual address with the virtual address indication stored in the entries of the storage structure in order to determine whether a hit condition is detected identifying that the address translation data required by the address translation request is stored within one of the entries of the storage structure;
wherein said portion of the new data required for conflict detection comprises said page size indication, the page size indication identifying which bits of the virtual address indication are compared with corresponding bits of the specified virtual address in order to determine whether the hit condition is present.

10. An apparatus as claimed in claim 9, wherein:
during performance of the lookup operation in respect of an entry, a first subset of the bits of the virtual address indication are compared with corresponding bits of the specified virtual address irrespective of the page size indication, and zero or more additional bits selected in dependence on the page size indication form a further subset of the bits of the virtual address indication to be compared with corresponding bits of the specified virtual address; and
the conflict detection circuitry is arranged to perform said at least one initial stage detection operation to determine, based on a comparison of said first subset of the bits of the virtual address indication for the new data with the first subset of the bits of the virtual address indication in the entries of the storage structure, the candidate entries whose data may conflict with the new data.

11. An apparatus as claimed in claim 10, wherein:
the conflict detection circuitry is arranged, once said page size indication is available for the new data, to determine said further subset of the bits and to perform said final stage detection operation to determine, based on a comparison of said further subset of the bits of the virtual address indication for the new data with the further subset of the bits of the virtual address indication in the entries of the storage structure, whether any of the candidate entries do contain data that conflicts with the new data.

12. An apparatus as claimed in claim 10, wherein:
the conflict detection circuitry is further arranged to perform said at least one initial stage detection operation to determine, for each possible page size, the corresponding bits for the further subset, and to perform an additional comparison operation in respect of the further subset for each possible page size in order to determine, for each possible page size, a list identifying any of the candidate entries that will contain data that conflicts with the new data when the new data relates to that possible page size; and
the conflict detection circuitry is arranged, once said page size indication is available for the new data, to perform said final stage detection operation to select, based on the page size indication, the corresponding list determined during performance of said at least one initial stage detection operation.

13. An apparatus as claimed in claim 9, wherein:
the conflict detection circuitry is arranged to employ a portion of the lookup circuitry to perform said at least one initial stage detection operation whilst the lookup operation is being performed, such that an indication of the candidate entries whose data may conflict with the new data is produced during the lookup operation; and
in the event of a miss condition being detected by the lookup operation, the allocation circuitry is arranged to select the victim entry, and to store within a first portion of the victim entry a virtual address indication determined from the specified virtual address.

14. An apparatus as claimed in claim 13, wherein the conflict detection circuitry is arranged to temporarily store the indication of the candidate entries whose data may conflict with the new data in a second portion of the victim entry non-overlapping with said first portion, until the conflict detection circuitry performs the final stage detection operation.

15. An apparatus as claimed in claim 14, wherein once said portion of the new data required for conflict detection is available, the conflict detection circuitry is arranged to read from the second portion of the victim entry the indication of the candidate entries whose data may conflict with the new data prior to the new data being allocated into the victim entry, and to perform said final stage detection operation to determine whether any of the candidate entries do contain data that conflicts with the new data.

16. An apparatus as claimed in claim 1, wherein the storage structure is a translation lookaside buffer (TLB).

17. A method of avoiding conflicting entries in a storage structure comprising a plurality of entries, each entry for storing data allocated into that entry, the method comprising:
determining, responsive to a trigger event for allocating new data into the storage structure, a victim entry into which the new data is to be stored, and allocating the new data into the victim entry upon determining that the new data is available;
detecting when the new data will conflict with data stored in one or more entries of the storage structure, and causing the data in said one or more entries to be invalidated;
the detecting step comprising:
performing, prior to a portion of the new data required for conflict detection being available, at least one initial stage detection operation to determine, based on an available portion of the new data, candidate entries whose data may conflict with the new data;
maintaining a record of the candidate entries;
performing, once said portion of the new data required for conflict detection is available, a final stage detection operation to determine whether any of the candidate entries do contain data that conflicts with the new data; and causing invalidation of the data in any entries identified by the final stage detection operation as containing data that conflicts with the new data.

18. An apparatus comprising:

a storage means comprising a plurality of entry means, each entry means for storing data allocated into that entry means;

allocation means for determining, in response to a trigger event for allocating new data into the storage means, a victim entry means into which the new data is to be stored, and for allocating the new data into the victim entry means upon determining that the new data is available;

conflict detection means for detecting when the new data will conflict with data stored in one or more entry means of the storage means, and for causing the data in said one or more entry means to be invalidated;

the conflict detection means:

for performing, prior to a portion of the new data required for conflict detection being available, at least one initial stage detection operation to determine, based on an available portion of the new data, candidate entry means whose data may conflict with the new data;

for maintaining a record of the candidate entry means;

for performing, once said portion of the new data required for conflict detection is available, a final stage detection operation to determine whether any of the candidate entry means do contain data that conflicts with the new data; and for causing invalidation of the data in any entry means identified by the final stage detection operation as containing data that conflicts with the new data.

* * * * *